Aug. 27, 1968 G. R. MOORE ET AL 3,398,499

INTERLOCKING EXTRUDED SECTIONS

Filed March 2, 1966

INVENTORS
GARY R. MOORE
WILLIAM O. HANSON

BY *Hauke, Krass, & Gifford*

ATTORNEYS

United States Patent Office 3,398,499
Patented Aug. 27, 1968

3,398,499
INTERLOCKING EXTRUDED SECTIONS
Gary R. Moore, 805 N. Main, Clawson, Mich. 48017, and William O. Hanson, Huntington Woods, Mich.; said Hanson assignor to said Moore
Continuation-in-part of application Ser. No. 479,738, Aug. 16, 1965. This application Mar. 2, 1966, Ser. No. 533,125
6 Claims. (Cl. 52—731)

ABSTRACT OF THE DISCLOSURE

Extruded structural members formed to be snapped together to form a hollow structural column and comprising a first structural member having an inwardly directed flange at each of opposite edges of the member, means forming slots along the inner edge of each of the flanges, a second structural member having an inwardly directed flange at each of opposite edges of the member and adapted to be snapped into the slots formed in the first member to thereby lock the members together and means formed along at least one of the surfaces of the structural column forming slots and oppositely directed flanges for securing other members to the structural column.

---

This application is a continuation-in-part of our copending application Ser. No. 479,738, filed Aug. 16, 1965, now abandoned.

The present invention relates to extruded structural members and in particular to such members having cross-sections adapted to allow two similarly shaped members to be locked together to form a hollow column, and wherein said extruded members have a configuration allowing them to be engaged, either in combination or independently of one another, to a third structural member such as to moldings for windows, and screens, etc.

Extruded structural members having a configuration which makes such members useful in a variety of applications are highly desirable for economical reasons. One of the objectives of the aforementioned co-pending application and of the present application is to provide a few basic multi-purpose extrusion sections. Thus my co-pending application discloses a pair of generally channel shaped extrusions which are useful in a variety of functions in forming structures, preferably of aluminum, and which additionally have such configuration that they may be locked together with their channels facing one another to form a closed, hollow, rectangular tube suitable for use as a column in such structures. The closed tube is provided with flat exterior surfaces suitable for attaching other structural members.

It is the object of the present invention to increase the usefulness of structural extrusions of these types by providing a pair of channel-shaped extrusions which may be locked together to form a hollow tube, and which additionally have such configurations that they may be locked to a third structural member, either independently or in the combined tube form. Thus a multitude of structures may be formed by using the preferred extruded sections as load bearing channels, columns or framing members in combination with window or screen moldings and other structural elements.

In a preferred embodiment of the present invention, which will subsequently be disclosed in detail, one of the extruded sections takes the form of an open sided channel comprising a web having a pair of parallel normally extending flanges and inwardly directed lips on the open ends of the flanges. A pair of parallel, longitudinal slots are formed in the exposed face of the web, each of the slots having an inwardly projecting lip forming an extension of the surface of the web. These exterior slots provide a means for engaging a structural element such as a window or screen molding having a surface with a pair of normally extending flanges provided with lips on the free end of the flanges. The molding flanges are adapted to be inserted into the web slots so that the respective lips engage in a locking relationship. The web also has a pair of longitudinally running channels formed in its enclosed face. The channels are adapted to receive the threaded ends of screws which amy be used to join a transversely extending member to the extrusion.

The second extrusion member is also generally channel shaped and includes a web with a pair of slots with inwardly projecting lips provided in its exposed face and a pair of channels formed in its enclosed face. However, instead of having inwardly turned lips on the open ends of the flanges, it has inwardly turned female slot carrying members adapted to receive the flange carried lips of the first extrusion so as to lock the two in mating relationship with their channels facing one another. The nature of the inwardly turned slot is such that the two channel sections may be locked together by pressing them toward one another with their inwardly turned mating members abutting one another.

The preferred extrusion may be utilized either separately or in combination to form a structural unit such as a screen or window frame retaining unit. In such an application a column comprising a mated pair of the preferred extrusion can also serve as a vertical jamb of the window frame. The opposite jamb and the sill and head members can each comprise a preferred open-channeled extrusion having their open edges facing outwardly and joined by threaded fasteners engaging the internal channels to define a rectangular opening. A peripheral window retaining tract can be formed by engaging to the frame members resilient molding members having a flange carrying surface provided with lip members adapted to join in locking engagement with the lip carrying slots in the inward facing webs of the extruded frame members. The flanges of the molding are preferably formed of a resilient material such as a vinyl so that the molding is engaged by pressing the flange carrying surface in abutting relationship to the extrusion web so that the flanges are elastically deformed by the pressure on the web lips until the flange lips slip around the web lips and then bend back into position wherein the respective lips are engaged.

It is therefore seen that the primary object of the present invention is to provide a pair of extrusion sections having generally open channel configurations and which may be locked together to form a closed hollow column, and which may be locked either in combination or independently of one another to a third structural element.

Another object is to provide such extrusion sections wherein each has an open channel section configuration with inwardly extending locking sections attached to the open channel ends and the locking action is achieved by mating between these locking sections.

A further object of the present invention is to provide such extrusion configurations wherein each has a web section with an exterior surface having a pair of slot sections, with an inwardly extending lip section attached to each of the slots and the slots and lips adapted to lockingly engage the extrusion web to a structural surface having a complementarily formed locking section.

Still a further object is to provide such extrusion configurations wherein each may be locked together to form a structural member or may be locked independently to a third structural element by pressing the sections together or by pressing either section toward the third structural element with their locking sections abutting so as to bend one of the locking sections.

Other objects, advantages and applications of the present invention will be made apparent by the following detailed description of a preferred embodiment of the invention. The description makes reference to the accompanying drawings, in which:

FIGURE 2 is a sectional view as seen from line 2—2 of FIGURE 1;

FIGURE 3 is a sectional view as seen from line 3—3 of FIGURE 1; and

FIGURE 4 is a sectional view as seen from line 4—4 of FIGURE 1.

Figure 1:
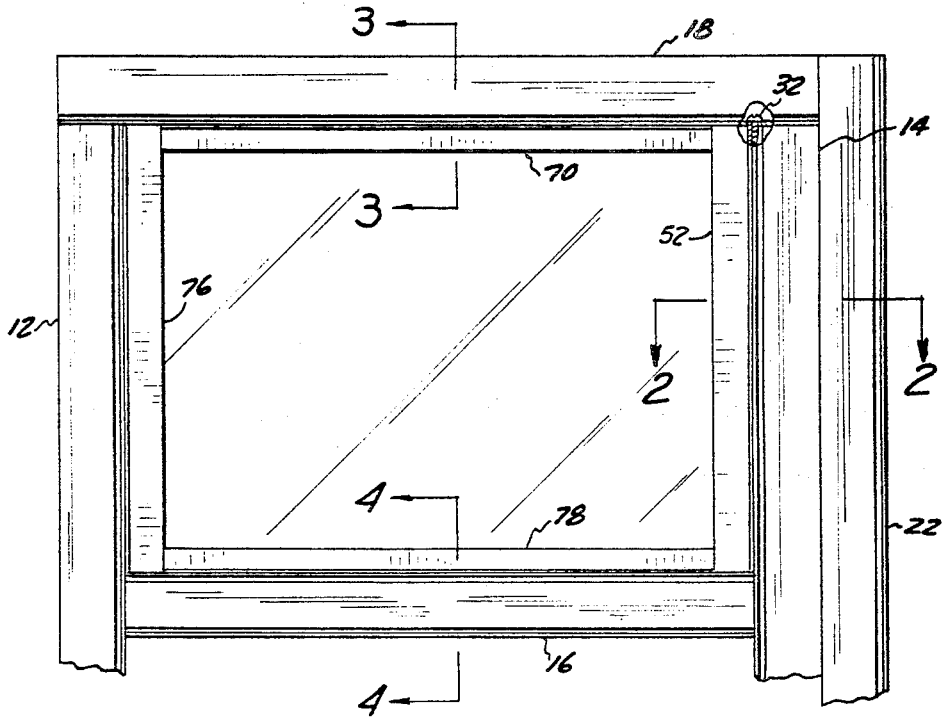
FIGURE 1 is a perspective view of a window retaining frame formed by joining together extrusions having a configuration of the invention.
Figure 1:
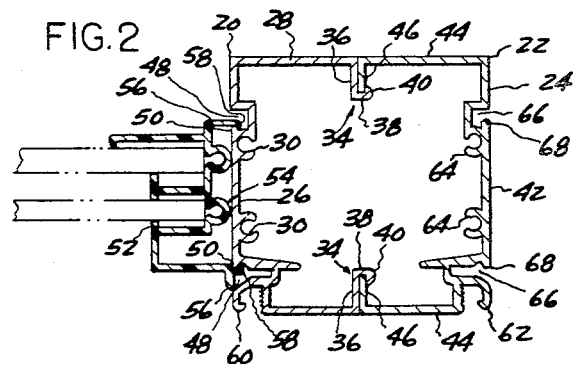
Figure 1:
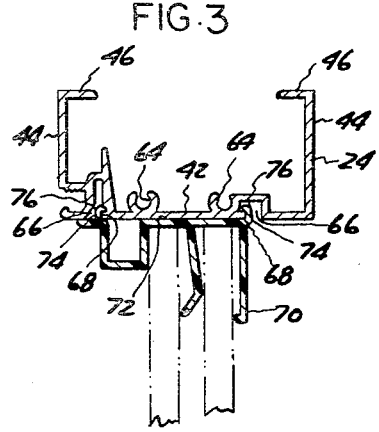
Figure 1:
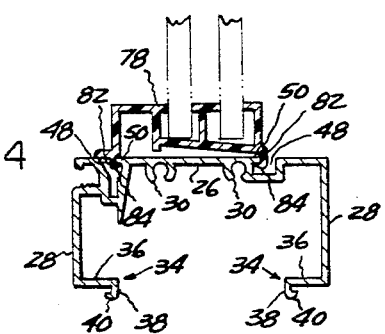

Referring to the drawings, FIGURE 1 illustrates the utility of the present invention in forming structural units such as a frame 10 for retaining a window, screen or the like. The frame 10 is preferably formed of aluminum extrusions comprising a left jamb member 12 and a right jamb member 14 connected by a sill member 16 and a head member 18 to define a rectangular opening.

Now referring to FIGURE 2, the jamb 14 is an extruded member generally channel shaped in cross-section and this configuration will be called the female cross-section 20. The jamb 14 is locked with a similar extrusion 22 having a channel shaped cross-section which will be referred to as the male cross-section 24.

The female cross-section 20 has a central web 26 and a pair of side flanges 28 which extend parallel to one another and perpendicular to the web 26.

The inner side of the web 26 carries a pair of longitudinally extending channels 30 adapted to receive the threaded ends of screws 32 used to join the jamb 14 to the transversely extending head member 18.

The free ends of the flanges 28 of the jamb 14 carry inwardly directed female slot carrying members, generally indicated at 34. The members 34 each consist of a connecting section 36 which connects the extreme end of one of the flanges 28 and projects normally thereto; a base section 38 which projects outwardly from the extreme end of the connecting section 36 normally thereto, and in a direction away from the web 26; and an end section 40 which projects normally from the base section 38 in the direction of the respective flange 28 that the connecting section 36 are joined to. Thus the connecting sections 36 and the end sections 38 have spaced parallel opposed faces.

The outer face of the end section 40 is slightly tapered with respect to its inner face so that the end section 40 achieves a maximum thickness at its joinder with the base section 38 and tapers almost to a point at its far end. The end sections 40 project outwardly from the base sections 38 only a portion of the full length of the connecting sections 36 so that the extreme ends of the end sections 40 are spaced inwardly of an imaginary line which would constitute an extension of the flanges 28. The female slot carrying members 34 assist in locking the jamb 14 to the extrusion 22, as will subsequently be described.

The extrusion 22 having the male cross-section 24 similarly has a central web 42 and a pair of parallel side flanges 44 which extend normally from the ends of the web 42 to form an open channel section. At the ends of the flanges 44, the extrusion 22 has a pair of inwardly directed lips 46 which extend transversely to the wall section in direct opposition to one another. The lips 46 act as male members in locking the extrusion 22 to the jamb 14.

FIGURE 2 illustrates how the jamb 14 having the preferred female cross-section 20 and the extrusion 22 having the preferred male cross-section 24 are locked together to form a square, hollow column. The manner of locking the extrusions comprises bringing the jamb 14 and the extrusion 22 into contact with their open channels facing one another so that the lips 46 on the extrusion 22 are in abutment with the outer faces of the end sections 40 of the jamb 14 and then applying pressure on the two extrusions to press them together. This pressure may be applied manually or in a suitable press. The pressure causes the connecting sections 36 to flex to move the end sections 40 inwardly with respect to the flanges 28 on the jamb 14. The tapered construction of the end sections 40 act as cams in the flexing of the connecting sections. This continues until the tips of the end sections 40 clear the extreme outer ends of the lips 46 on the extrusion 22, allowing the ends of the lips 46 to slip in between the inner face of the end sections 40 and the opposite face of the connecting sections 36. As pressure is relieved, the connecting sections 36 return back to their normal position. The locking pressure applied to the two extrusions is not sufficient to strain the joint between the connecting sections 36 and the flanges 28 beyond their elastic limits, so that the sections snap back into position after the pressure is relieved. With the jamb 14 locked with the extrusion 22, they can be separated only by sliding the units longitudinally with respect to one another.

Still referring to FIGURE 2, a pair of parallel slots 48 are formed in the outer face of the web 26 and running longitudinally of the jamb 14. At the inner side of the slots 48, the web 26 has a pair of lips 50 extending transversely to the slot openings and preferably forming an extension of the outer face of the web 26 over the slots 48.

The lips 50 act as retaining members in locking the jamb 14 to a structural element such as molding 52. The molding 52 has a configuration useful in retaining a window or screen (not shown) on its inward facing side. The nature of the retaining portion is not of importance to this invention. The molding 52 has a face 54 which abuts the web 26 and carries a pair of flanges 56 extending normally from the face 54. The free end of the flanges 56 have inwardly extending and tapered lips 58 which are adapted to be inserted into the web slots 48 and lockingly engage with the lips 50.

Preferably the molding 52 is formed of a plastic extrusion such as a vinyl having resilient flanges 56. The molding 52 is engaged with the jamb 14 in locking relationship by bringing the molding lips 58 in abutting relationship with the jamb lips 50, and applying pressure on the molding 52 against the jamb 14 so that the pressure of the lips 50 on the tapered outer faces of the lips 58 flex the resilient flanges 56 outward. The pressure continues until the inner ends of the molding lips 58 clear the extreme outer ends of the jamb lips 50 and slip into the slots 48 and behind the lips 50. At this point the lips 58 are locked within the slots 48 so that they can only be removed by sliding the units longitudinally with respect to one another.

At the joinder of the web 26 and the flange 28, the jamb 14 has a longitudinally extending molding section 60 which is useful for retaining the edges of screens and the like. The extrusion 22 has a similar molding section 62 at the joinder of the web 42 and flange 44. The exact configuration of the moldings 60 and 62 is not of importance to the present invention.

On the inner side of the web 42, the extrusion 22 carries a pair of longitudinally running channels 64 adapted to receive threaded ends of screws (not shown) and useful to join the end of extrusion 22 to a transversely extending member in the manner that the jamb 14 is joined to head member 18.

On the outer face of the web 42, the extrusion 22 also has a pair of parallel slots 66 and a pair of lips 68 extending transversely of the slot openings preferably forming an extension of the outer face of the web 42 over the slots 66. The slots 66 and the lips 68 are formed to the slots 48 and lips 50 carried by the jamb 14 and cooperate to lock the extrusion 22 to moldings for retaining windows, screen, etc., in the same manner that the jamb 14 is locked to the molding 52.

It is apparent that we have described a jamb 14 illustrating an extruded section having the preferred female cross-section 20 and the extrusion 22 illustrating the preferred male cross-section 24 and how such extrusions having the cross-sections illustrating the invention may be locked to one another to form a column by applying pressure on the jamb 14 and the extrusion 22 toward one another. We have also described how the jamb 14 having the preferred female cross-section 20 while in a locked combination with the extrusion 22 may be engaged in a locking relationship to the molding 52 having any desirable configuration for retaining a window screen or the like. In addition we have described how the jamb 14 may be joined with the transversely extending head member 18.

Now referring to FIGURE 3, the head member 18 has the male cross-section 24 and has locked on its inward facing side a molding 70 aligned with the molding 52 so as to retain a window, screen, etc. The molding 70 has a configuration suitable to retain a window different from the configuration of molding 52 and including a surface 72 abutting the outward face of the web 42. A pair of flanges 74 extend normally to the face 68 and carry a pair of lips 76 which are retained by the lips 68 so that the molding 70 is locked to the head member 18 in the same manner that the molding 52 is locked to jamb 14.

The left jamb 12 is connected to the head member 14 and the sill 16 and may have either the female cross-section 20 or male cross-section 24. The jamb 12 carries in locked relationship a molding 76 having a configuration identical to molding 52.

The sill member 16, as can be seen in FIGURE 4, has the female cross-section 20 and illustrates how such an extrusion can be joined to a window molding 78 independently of an extrusion having the male cross-section 24. The molding 78 is aligned with the moldings 52 and 76 and has a suitable configuration for retaining a window which is not important to this invention. The molding 78 has a surface 80 abutting the outward face of the web 26 and carries a pair of flanges 82 having inwardly extending lips 84 adapted to engage with the lips 50 so that the molding 78 is locked with the sill 16 in the same manner that the molding 52 is locked with the jamb 14.

It is apparent that we have described how a pair of extruded members having a preferred female cross-section 20 and a preferred male cross-section 24 may be locked together to form a hollow column and the combination locked to a third molding member having any suitable configuration for retaining a window, screen or the like. Furthermore we have described how extrusions having either the preferred male cross-section 20 or the preferred female cross-section 24 may be used independently of one another to engage a molding having any desirable configuration. In addition we have described how extrusions having the preferred cross-section can be joined in a transverse relationship.

Although we have described but one preferred embodiment of our invention it is apparent that many modifications would be made therein by one skilled in the art to which the invention pertains without departing from the spirit of the invention as expressed in the scope of the appended claims.

We claim:
1. A pair of extruded sections having configurations which allow them to be locked together to form a structural unit comprising,
   (a) said sections having a cross section with a web and a pair of flanges extending normally from the web and parallel to one another,
   (b) female locking means formed on the extreme edges of the flanges of one of said sections,
   (c) male locking means formed on the extreme edges of the flanges of the other section,
   (d) said male locking means comprising lips extending inwardly from the extreme ends of said flanges toward one another, and said female locking means each comprising a connecting section, said connecting sections projecting inwardly toward one another at the ends of and normal with respect to said flanges, a base section projecting outwardly from and normal to the extreme end of the connecting section, said base section spacing said connecting section and said end section to form a slot therebetween of a width substantially equal to the thickness of said flanges whereby said lips are operable to be disposed within said slot upon forces being exerted on the two sections in the direction of one another while the lip is disposed in abutting relationship to said end sections.

2. The invention as defined in claim 1, including locking means formed in the web of one of said extrusions and a structural element; locking means formed in a surface of said structural element, said last mentioned locking means adapted to be locked into engagement with said web carried locking means by placing the surface of said structural element adjacent said web and exerting a force on said structural element and said extruded section toward one another.

3. The extruded sections of claim 1 wherein the forces exerted on the two extruded sections when the male and female locking means are in abutting relationship cause one of the locking sections to be elastically bent into position where it is operative to engage with the other locking means and the removal of the force allows the bent means to rebend back into its original position, retaining its engagement with the other locking means.

4. The extruded sections of claim 3, wherein the web of one of said extruded sections has a flat outer surface with a pair of longitudinally extending slots defined in said surface, and a pair of lip members extending from one edge of said slots and forming an extension of said surface partly over the open face of said slots.

5. The extruded sections of claim 4, wherein the web of one of said extruded sections has means disposed interiorly of said extruded section for cooperating with fastener means in joining a structural member in transverse relationship to said extruded section.

6. A pair of extruded sections having configurations which allow them to be locked together to form a structural unit, said sections comprising,
   (a) each of said sections having a cross section with a web and pair of flanges extending normally from the web, and
   (b) female locking means formed on the extreme edges of the flanges of one of said sections, and male locking means formed on the extreme edges of the flanges of the other section with said female locking means engaging said male locking means to lock said sections together,
   (c) at least one of said female locking means comprising a connecting section projecting inwardly from one of said flanges at the end of and normal with respect thereto, a base section extending from and normal to the extreme end of the connecting section, and a return bent section spacing said end section and said connecting section to form a slot therebetween, and an inwardly directed lip formed on the adjacent flange of the other of said sections with the width of said lip being substantially that between said end section and said connecting section whereby upon forces being exerted on the two sections in the directions of one another said lip will be pushed over said end section and into said slot; and (d) the inward dimension of said lip being substantially greater than the width of the space between said end section and said connecting section.

References Cited

UNITED STATES PATENTS

| | | | |
|---|---|---|---|
| 3,040,389 | 6/1962 | Fengler | 52—400 XR |
| 3,143,165 | 8/1964 | Lewis et al. | 52—731 XR |
| 3,196,495 | 7/1965 | Owen | 52—727 XR |
| 3,267,629 | 8/1966 | Waring et al. | 52—495 XR |
| 3,305,221 | 2/1967 | Kling | 52—731 XR |
| 3,327,438 | 6/1967 | Cooper | 52—731 XR |

BOBBY R. GAY, *Primary Examiner.*

ANDREW M. CALVERT, *Assistant Examiner.*